United States Patent [19]

Koch, Jr. et al.

[11] 3,773,157
[45] Nov. 20, 1973

[54] CLUTCH WITH COOLANT CUT-OFF VALVE

[75] Inventors: Franklin O. Koch, Jr., Edelstein; Donald E. Lull, Peoria, both of Ill.

[73] Assignee: Caterpillar Tractor Co., Peoria, Ill.

[22] Filed: Dec. 13, 1971

[21] Appl. No.: 207,450

[52] U.S. Cl. ...... 192/113 B, 192/13 R, 137/625.67
[51] Int. Cl. ............................................. F16d 13/72
[58] Field of Search .................................. 192/113 B

[56] References Cited
UNITED STATES PATENTS

| 3,540,557 | 11/1970 | Hasselbacher | 192/18 A |
| 3,314,513 | 4/1967 | Lake et al. | 192/113 B |
| 3,351,169 | 11/1967 | McIndoe | 192/113 B X |
| 3,547,235 | 12/1970 | Weinrich | 192/113 B X |
| 3,104,746 | 9/1963 | Gadd et al. | 192/113 B X |
| 3,334,717 | 8/1967 | Spokas et al. | 192/113 B X |

Primary Examiner—Benjamin W. Wyche
Attorney—Freling E. Baker

[57] ABSTRACT

A wet clutch comprising rotatable input means and rotatable output means with friction means engageable to establish a connection between the input and output means and circulating fluid to cool the friction means is provided with means to divert the fluid from the friction means during disengagement thereof to eliminate viscous drag therein.

1 Claim, 4 Drawing Figures

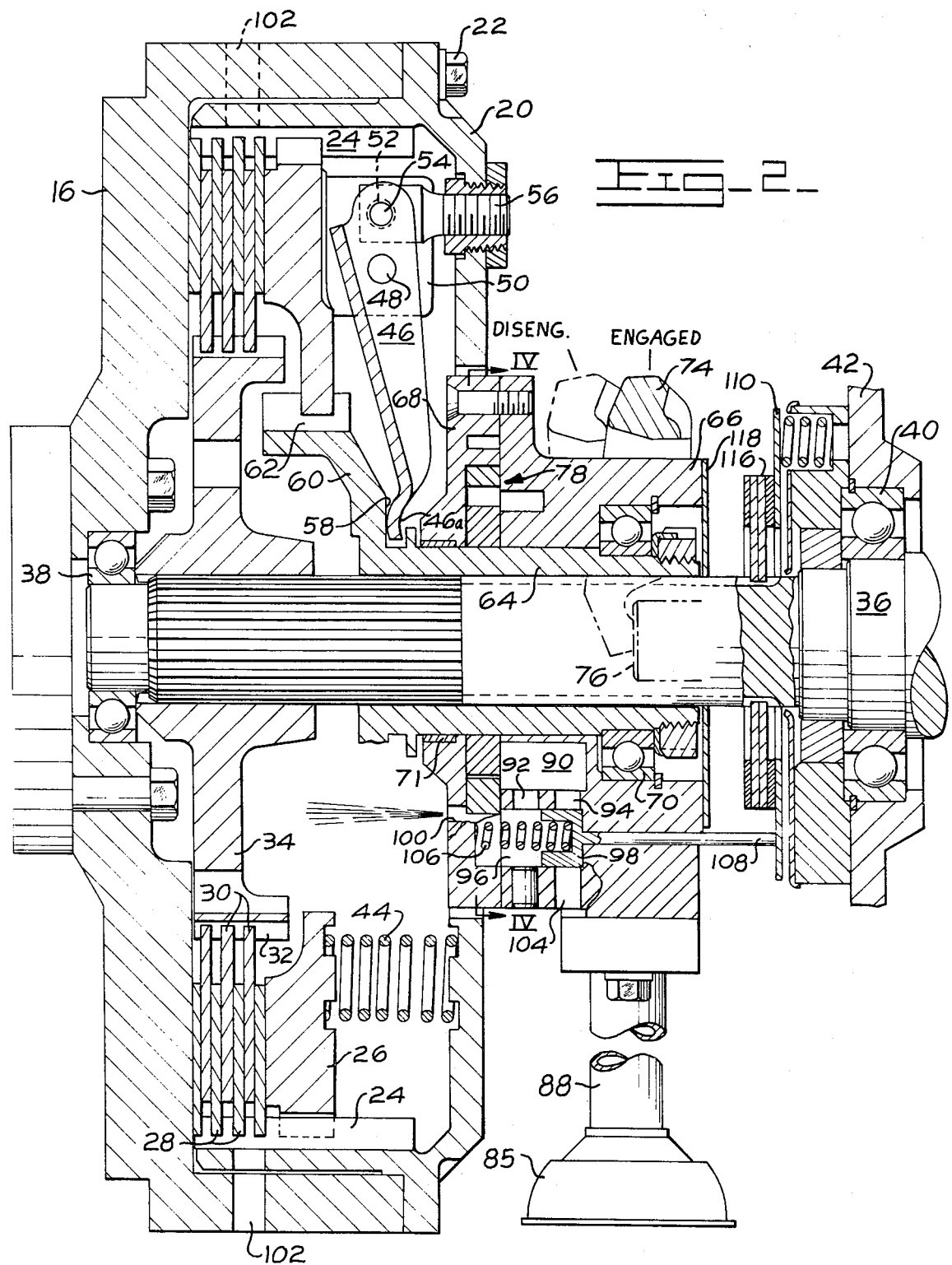

PATENTED NOV 20 1973 3,773,157
SHEET 3 OF 3
Fig-3-
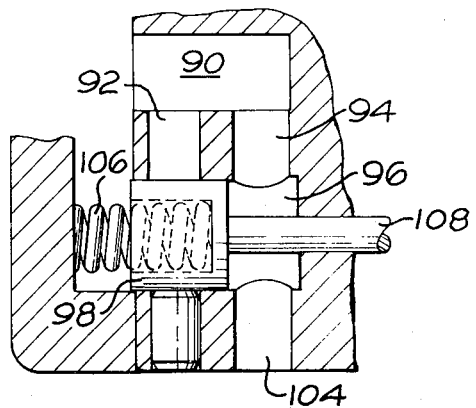
Fig-4-
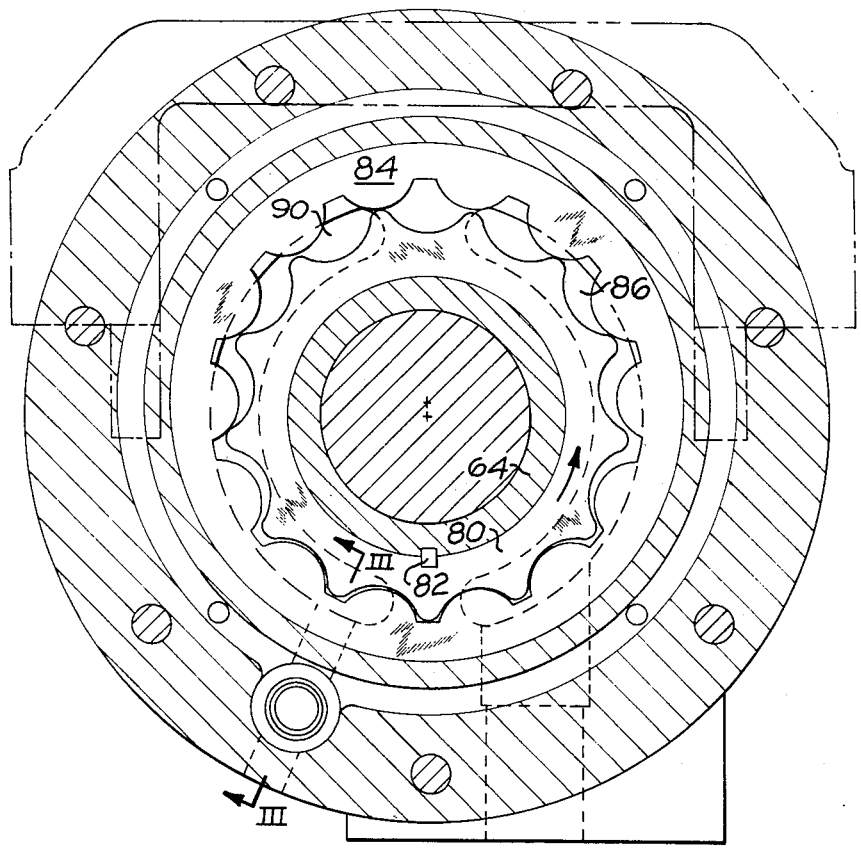

CLUTCH WITH COOLANT CUT-OFF VALVE

BACKGROUND OF THE INVENTION

The present invention relates to frictional devices and pertains more particularly to a wet clutch system having circulating fluid.

Clutches used in heavy duty vehicles normally use circulating fluid for cooling the frictional faces. These clutches are normally termed wet clutches in the art, and are normally continuously bathed in oil for cooling purposes. This type clutch is essential in heavy duty vehicles which undergo frequent changes in speed and/or direction.

One problem presented by such clutches is the viscous drag resulting from oil flowing between the clutch plates when the clutch is in the released position. This viscous drag results in the clutch not being fully released. This problem is especially severe when the oil in the transmission is cold.

Presently known clutches of this type attempt to overcome this problem by providing a transmission brake which is actuated upon release of the clutch. This arrangement complicates the construction of clutch systems and adds to the cost thereof. In addition, the brakes frequently need replacing because of wear.

SUMMARY OF THE INVENTION

It is the primary object of the present invention to overcome the above problems of the prior art by providing an improved wet clutch having means to reduce viscous drag.

Another object of the present invention is to provide an improved wet clutch having means to reduce the need for a transmission brake.

In accordance with the present invention, the above problems of the prior art are overcome by providing a wet clutch having means to divert fluid from the clutch plates during release thereof.

BRIEF DESCRIPTION OF THE DRAWINGS

The above and other objects and advantages of the present invention will become apparent from the following description when read in conjunction with the accompanying drawings wherein:

FIG. 2 is an elevational view in section of a clutch embodying the clutch of FIG. 1;

FIG. 3 is a sectional view taken along line III—III of a portion of FIG. 4;

FIG. 4 is a sectional view taken generally along lines IV — IV of FIG. 2.

DETAILED DESCRIPTION OF PREFERRED EMBODIMENTS

Figure 1:
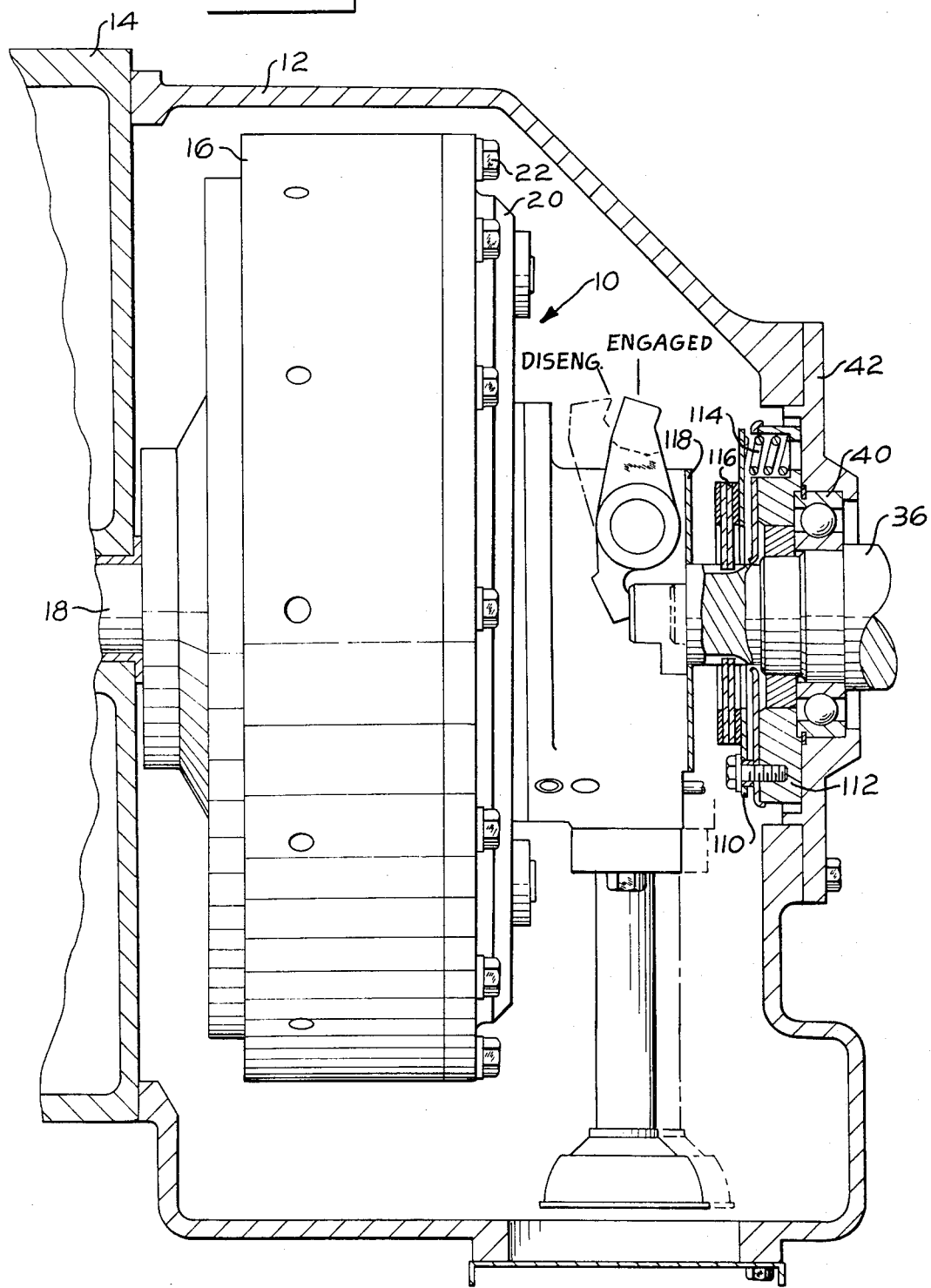
FIG. 1 is an elevational view of a clutch system embodying the present invention.

Referring now to the drawings, and particularly to FIG. 1, there is illustrated a clutch assembly in accordance with the present invention generally designated by the numeral 10 and supported in a housing 12 which, in turn, is attached in a suitable manner to a housing 14 of an engine or other suitable source of rotatory power. The clutch comprises input means which, as illustrated, may comprise a rotatable housing 16 which may be a flywheel for an engine and is connected in a suitable manner to a suitable rotating shaft 18 such as the crankshaft of an engine. The input means further comprises an input drum or housing member 20 attached such as by bolts 22 to the flywheel 16 and cooperating therewith to define an annular enclosure or chamber in which the clutch assembly is disposed.

The drum or housing member 20 has a plurality of splines 24 disposed around the inner diameter thereof for operatively engaging with complementary splines found on the outer diameter of a pressure plate 26 and a plurality of friction discs 28 for transmitting torque thereto. Friction means comprising the friction discs 28 interspersed with friction discs 30 which are splined at 32 to hub 34 comprise friction means for transmitting torque from the input means comprising flywheel 16 to output means comprising hub 34 and shaft 36. The output shaft 36 may comprise the input or stub shaft of a transmission and is rotatably supported in a pilot bearing 38 carried in flywheel 16 and a bearing 40 mounted in housing member 42.

The frictional discs 28 and 30 are biased into frictional engagement for the purposes of transmitting torque from the input means to the output means by means of a pressure plate 26 having resilient means such as a plurality of springs 44 compressed between housing member 20 and the pressure plate 26 for urging the pressure plate into frictional engagement with the frictional discs. Means for releasing the clutch and overcoming the spring pressure by pulling the pressure plate 26 away from the frictional discs comprises a lever 46 pivoted about a pin 48 carried on a block or member 50 attached to the pressure plate 26. The lever 46 is connected by slotted or oversized hole 52 to a pin 54 carried on a support member 56 attached to the housing 20. The inner end 46a engages shoulder or hub 58 of crank member 60 which is keyed at 62 to pressure plate 26 and attached in a suitable manner to a sleeve 64 which is slidably mounted on shaft 36.

A pump housing comprising members 66 and 68 is rotatably mounted with respect to the sleeve 64 such as by means of thrust bearing 70 and sleeve bearing 71, and is mounted to move axially therewith. The housing 66 and 68 also provides means about which thrust is applied from a yoke 74 and extension members 76 fixed to the member 66 for releasing of the clutch or friction means by way of application of force to lever 46. Axial movement of the sleeve 64 applies thrust through hub 58 to end 46a of the lever 46, causing it to pivot about pivot point 54 and thereby pulling pressure plate 26 away from engagement with the frictional discs 28 and 30. This permits the discs 28 to move relative to discs 30 and thus interrupt transmission of torque from the input means 16 to the output shaft 36.

Referring to FIG. 4, means comprising a pump 78 are provided for circulating cooling fluid through the clutch assembly. The pump 78 comprises an inner gear 80 keyed at 82 to sleeve 64 for rotation therewith. An outer gear 84 meshes with the inner gear 80 and cooperates therewith for pressurizing the fluid. These gears are disposed in an annular cavity formed between members 66 and 68 of the pump housing. A low pressure or suction chamber 85 communicates with one side of the pump cavity 86 by way of conduit means 88 for drawing fluid from a sump formed by the lower portion of housing 12. The fluid is transferred from the low pressure side of the pump to high pressure chamber 90 which communicates by way of passageways 92 and 94 with the cylindrical bore 96 in which is reciprocally mounted a diverter valve 98. The diverter valve is operative in a first position, as illustrated, to direct fluid through a passage or outlet 100 where it is sprayed against hub 34 and is forced outward by means of centrifugal force between friction discs 28 and 30 and out openings 102 where it returns to the sump. The discs are preferably constructed with radial grooves formed in the face thereof to permit the passage of fluid therethrough.

The diverter valve 98 is responsive upon movement to a second position, as shown in FIG. 3, to divert fluid from the clutch assembly and direct it by way of passage 104 to the sump. The diverter valve 98 is biased to its open or cooling flow position, as illustrated in FIG. 2, by means of a spring 106 when the clutch assembly is in the engaged position. Upon disengagement of the clutch assembly, housing 66 is moved to the right with the valve 98 being held in its position by means of a control rod 108 which is held in a fixed position by fixed means within the system, such as by engagement with a brake member 110 to be described. Movement of the housing 66 to the right with respect to the valve 98 opens passageways 94 and 104 for free flow of the fluid from the pressure chamber directly to the sump as illustrated in FIG. 3. This results in a supply of fluid to the clutch disc assembly being cut off and the fluid therein quickly flowing from the housing under centrifugal force out passages or openings 102 (FIG. 2). This diversion of fluid and the centrifugal force results in the space between discs 28 and 30 being free of oil which normally causes viscous drag. This results in an elimination of viscous drag which normally exists in a continuous flow system with the result that transmission brake assemblies can be, in most instances, entirely eliminated. It may be, however, desirable to retain the brake assembly for instances in which the rotating parts must be decelerated rapidly when speed shifting of the transmission occurs.

Transmissions for heavy duty vehicles are normally provided with a brake assembly. A typical brake assembly is illustrated, comprising a disc 110 fixed against rotation with respect to housing member 112 and biased by a spring means 114 for engagement with friction discs 116 which are splined to shaft 36 for rotation therewith. A friction member such as a disc 118 is attached to housing 66 and movable therewith for engagement with discs 116 for providing braking for shaft 36. The frictional discs 116 are interposed between disc 118 and disc 110 for frictional engagement therewith.

As previously mentioned, the present invention results in an almost total elimination of the need for the brake assembly when the clutch assembly in accordance with the present invention is operated in its normal manner. The exception, however, is as mentioned above, wherein speed-shifting occurs without time for inertia of the hub 34 and shaft 36 to dissipate.

While the present invention has been illustrated with respect to a specific embodiment, it is to be understood that changes and modifications can be made in the illustrated structure without departing from the spirit and scope of the present invention as defined in the appended claims.

We claim:

1. An oil cooled clutch system, said system comprising:

rotatable input means and rotatable output means coaxially disposed and defining an annular chamber;

said output means comprising a rotatable shaft extending from said chamber and friction elements disposed in said chamber and operative to interengage with friction means connected with said input means to establish a connection between said input means and said output means;

means including a sleeve mounted for axial and rotational movement on said rotatable shaft to disengage said friction means to thereby disconnect said output means from said input means;

housing means mounted on said sleeve for axial movement therewith and rotational movement with respect thereto; and means including a pump mounted in said housing and operatively driven by said input means to provide a continuous supply of oil to said friction means during engagement thereof and diverter valve means to completely interrupt said supply during disengagement of said friction means, and means to move and close said diverter valve comprising a control rod connected to and extending from said valve and engaging axially fixed structure adjacent the clutch system.

* * * * *